(12) United States Patent
Mathias et al.

(10) Patent No.: US 6,569,231 B1
(45) Date of Patent: *May 27, 2003

(54) PIGMENT PREPARATIONS, A PROCESS FOR PREPARING PIGMENT PREPARATIONS AND USE THEREOF

(75) Inventors: Johann Mathias, Kahl (DE); Horst Kleinhenz, Grosskrotzenburg (DE); Alfons Karl, Gründau (DE); Gerd Tauber, Seligenstadt (DE)

(73) Assignee: Degussa AG, Dusseldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/688,204

(22) Filed: Oct. 16, 2000

(30) Foreign Application Priority Data

Oct. 16, 1999 (DE) .......................................... 199 50 043

(51) Int. Cl.⁷ .............................................. C09D 11/00
(52) U.S. Cl. ................... 106/31.9; 106/503; 106/31.89; 106/472
(58) Field of Search ............................... 106/31.9, 503, 106/31.89, 472

(56) References Cited

U.S. PATENT DOCUMENTS

| | | | |
|---|---|---|---|
| 3,133,893 A | 5/1964 | Newman et al. ............ | 324/720 |
| 4,055,439 A | 10/1977 | Bäbler et al. ............... | 106/410 |
| 4,368,582 A | 1/1983 | Graser et al. ................ | 34/405 |
| 4,909,853 A | * 3/1990 | Wienkenhover et al. | |
| 5,859,120 A | 1/1999 | Karl et al. ................... | 524/495 |
| 5,976,233 A | * 11/1999 | Osumi et al. | |
| 6,099,818 A | 8/2000 | Freund et al. ............ | 423/449.1 |
| 6,171,382 B1 | * 1/2001 | Stubbe et al. | |
| 2001/0036994 A1 | 11/2001 | Bergemann et al. | |

FOREIGN PATENT DOCUMENTS

| | | |
|---|---|---|
| DE | 25 40 355 | 3/1976 |
| DE | 195 21 565 | 1/1997 |
| DE | 196 13 796 | 10/1997 |
| DE | 196 44 077 | 5/1998 |
| DE | 198 24 047 | 12/1999 |
| DE | 100 12 784 | 9/2001 |
| DE | 100 12 783 | 10/2001 |
| EP | 0 036 520 | 9/1981 |
| EP | 0 282 855 | 9/1988 |
| EP | 0 728 780 | 8/1996 |
| EP | 0 744 446 | 11/1996 |
| EP | 0 805 191 | 11/1997 |
| EP | 0 896 986 | 2/1999 |
| EP | 962504 | * 12/1999 |
| EP | 0 962 504 | 12/1999 |
| EP | 1 054 045 | 11/2000 |
| EP | 1 072 654 | 1/2001 |
| JP | 1-132377 | 5/1989 |
| JP | 411080636 A | * 9/1997 |
| WO | WO 96/18688 | 6/1996 |
| WO | WO 98/42778 | 10/1998 |
| WO | WO 98/45361 | 10/1998 |
| WO | WO 00/60015 | 10/2000 |

OTHER PUBLICATIONS

English language abstract of KR above.
English language abstract of LR above.
English language abstract of MR above.
English language abstract of NR above.
English language abstract of OR above.

* cited by examiner

*Primary Examiner*—Cynthia H. Kelly
*Assistant Examiner*—Tamra Dicus
(74) *Attorney, Agent, or Firm*—Pillsbury Winthrop LLP

(57) ABSTRACT

A pigment preparation, containing a pigment and/or carbon black and a polymer and/or a surfactant selected from the group of cross-linked polyoxyethyleneacrylic acid, fatty alcohol polyglycol ethers, polyvinylpyrrolidone, alcohol alkoxylates, lignin sulfonates, alkylphenol polyglycol ethers, naphthalene sulfonic acid derivatives or mixtures thereof which is prepared from an aqueous dispersion by freeze-drying. The pigment preparation can be used for coloring purposes and/or to provide antistatic characteristics in water-based coloring and lacquer systems, disperse dyes, printing inks, inking systems and coating systems.

10 Claims, No Drawings

PIGMENT PREPARATIONS, A PROCESS FOR PREPARING PIGMENT PREPARATIONS AND USE THEREOF

CROSS-REFERENCE TO RELATED APPLICATION

This application claims priority to German Application DE 199 50 043.6, filed on Oct. 16, 1999, which disclosure is incorporated herein by reference.

FIELD OF THE INVENTION

The invention provides pigment preparations, a process for preparing pigment preparations and use thereof.

BACKGROUND OF THE INVENTION

Powdered pigments are used to color thermoplastic materials. The advantage of powdered pigments is that they do not depend on the use of a support material. However, this advantage is often produced at the cost of dispersibility.

To improve dispersibility, the pigments are often coated with a resin (DE 2540355) or with polymers (U.S. Pat. No. 3,133,893).

Special drying processes are known from EP 0036520, wherein finely divided pigments and a liquid, the critical temperature of which is below the decomposition temperature of the pigment, are heated under pressure to temperatures above the critical temperature of the liquid and the pressure is then reduced to atmospheric pressure, wherein the temperature is always kept above the condensation line of the liquid.

In addition, pigment preparations are known from EP 0282855, these contain an organic pigment and/or carbon black and a surfactant selected from the group of alkylbenzene sulfonates and sulfosuccinates, and which are dried, optionally after wet-crushing, by spray-drying or freeze-drying from an aqueous medium. In the case of sulfosuccinates, the organic pigments are chosen from a specific group.

The known processes have the disadvantage that redispersibility is poor.

SUMMARY OF THE INVENTION

The object of the present invention is to prepare a pigment preparation which has good redispersibility, flow characteriztics and color intensity and a low tendency to form dust.

The invention provides a pigment preparation which contains a pigment and/or carbon black and a polymer and/or a surfactant selected from the group of cross-linked polyethylene acrylic acid, polyvinylpyrrolidone, alcohol alkoxylates, fatty alcohol polyglycol ethers, lignin sulfonates, alkylphenol polyglycol ethers, naphthalene-sulfonic acid derivatives or mixtures thereof, characterized in that these are prepared by freeze-drying from aqueous dispersion.

Colored pigments may be used as pigments, for example yellow, orange, red, violet, blue, green or brown pigments. Inorganic blue pigments, for example iron blue, ultramarine blue, cobalt blue or mixed phase blue pigments, or organic blue pigments, for example phthalocyanine blue or indanthrene blue may preferably used as pigments. The carbon black used may be furnace black, gas black, channel black, lamp black or acetylene black or Si-containing carbon black, known from WO 98/45361 or DE 19613796, surface-modified carbon black, known from DE 10012783.5, DE 10012784.3, JP 11323177 or WO 96/18688, inversion black, known from DE 19521565, and metal-containing carbon blacks, known from WO 98/42778. The carbon black used may preferably be a pigment carbon black with an average particle diameter of 8 to 80 nm, preferably 10 to 35 nm, and a DBP number of 40 to 200 ml/100 g, preferably 60 to 150 ml/100 g. In a particularly preferred embodiment of the invention, gas black with an average particle diameter of 8 to 30 nm, preferably 10 to 25 nm, may be used.

The polymer may be a copolymer, block copolymer, polyampholyte or intermeshed polymer. The molecular weight Mw of the polymer may be less than 100,000 g/mol, preferably less than 10,000 g/mol. Copolymers based on (meth)acrylic acid with basic (meth)acrylates, such as dimethylaminoethyl (meth)acrylate and dimethylaminopropyl (meth)acrylamide and its quaternary ammonium compounds and also other alkyl or aryl (meth)acrylates (for example $C_{4-30}$-alkyl (meth)acrylate, cyclohexyl (meth)acrylate, benzyl (meth)acrylate, phenylethyl (meth)acrylate), heterocyclic (meth)acrylates (for example morpholinoethyl (meth) acrylate, N-(2-methacryloyloxyethyl)ethylene-urea) or hydroxyesters (for example 2-hydroxyethyl (meth)acrylate, hydroxypropyl (meth)acrylate) or alkyl polyethylene glycol (200–2000)(meth)acrylates (for example methoxypolyethylene glycol-750 methacrylate) may be used. The polyampholytes used may be water-soluble polymers based on (meth)acrylic acid which have dispersing or pigment-stabilizing properties and which are also intended to prevent diffusion into the surface of paper by interacting with the carbon black pigments. The intermeshing polymers used may be graft polymers with emulsifying properties which are obtained by copolymerizing hydrophobic, terminally functionalized macromonomers with hydrophilic monomers (EP 0 728 780 B1). Macromonomers with (meth)acryloyl terminal groups are prepared, for example, from $C_8$–$C_{30}$-alkyl methacrylates, cyclohexyl methacrylate or benzyl methacrylate and are then copolymerized with hydrophilic (meth)acrylates (for example (meth)acrylic acid, (meth) acrylamide, 2-hydroxyethyl (meth)acrylate, hydroxypropyl (meth)acrylate, dimethylaminoethyl (meth)acrylate and dimethylaminopropyl (meth)acrylamide and its quaternary ammonium compounds). Block copolymers with the same monomer composition are equally suitable for use here.

Polymers which may be used are copolymers which are prepared from acrylamide monomers and at least one monomer selected from acrylic acid, dimethylaminopropylamine, dimethylaminopropylacrylamide (basic, neutral, quaternized), dimethylaminoethyl acrylate and dimethylaminoethyl methacrylate.

The polymer may be a mixture of two or more polymers.

The dispersion may contain a combination of wetting agents, such as two wetting agents.

In one embodiment of the invention, a combination of
(a) a cross-linked polyoxyethylene acrylic acid and
(b) an alkoxyethylate, preferably a fatty alcohol ethoxylate, in particular a fatty alcohol ethoxylate with 30 ethylene glycol units,
is used, wherein the ratio of surfactants a:b=1:1 to 1:10.

The pigment preparation may contain 50 to 99 wt. %, preferably 60 to 90 wt. %, of pigment and/or carbon black and 1 to 50 wt. %, preferably 10 to 40 wt. %, of surfactant and/or polymer.

All pigment dispersions which remain stable during the freezing process and do not flocculate are suitable for use in the process of freeze-drying.

The invention also provides a pigment preparation containing a self-dispersing carbon black, which is characterized in that this is prepared by freeze-drying from aqueous dispersion. Self-dispersing carbon blacks may be surface-modified carbon blacks, known from DE 10012783.5, DE 10012784.3, DE 198 24 047.3, JP 11323177 or WO 96/18688. Self-dispersing carbon blacks can form a stable dispersion in an aqueous medium without the addition of surfactants or polymers.

The invention also provides a process for preparing the pigment preparation which is characterized in that the aqueous pigment preparation is dried by freeze-drying and then optionally crushed.

To prepare the aqueous pigment preparation, pearl mills, ultrasound or an Ultra-Turrax mill may be used to form the dispersion.

Freeze-drying and drying may be performed in an ice condenser chamber. The rate of freezing can be between 0.01° and 10° C./min, preferably between 0.1° and 3.0° C./min.

The optimum freeze-drying conditions depend strongly on the product. The product temperature may be 10° C. below the eutectic point of the samples. The reduced pressure to be set can then be deduced from the product temperature.

Carbon black dispersions according to the invention may be used for coloring purposes and/or to provide antistatic characteristics in water-based coloring and lacquer systems, disperse dyes, printing inks, inking systems and coating systems.

Pigment preparations according to the invention advantageously have a more intense color than non-freeze-dried pigment preparations.

DETAILED DESCRIPTION OF THE PREFERRED EMBODIMENTS

EXAMPLES

Comparative Examples 1–4
(In Accordance with EP 0 282 855)
1. Preliminary Preparation of the Wetting Agent Solution
   Water is initially introduced and Lutensit A-LBS or Lutensit A-BO is dissolved therein.
2. Incorporating the Carbon Black
   Pigment black FW 18 or Printex 90 is gradually incorporated into the prepared wetting agent solution, with slow stirring (either manual or with a slow stirrer).
3. Dispersing
   The dispersion prepared in paragraph 2, above, is dispersed using ultrasound. Very coarse particles can be separated from the dispersion obtained in this way in a centrifuge.

The composition of the aqueous carbon black dispersions is given in Table 1.

TABLE 1

| Comparative Example No. Dispersion: by ultrasound Components | 1 wt. % | 2 wt. % | 3 wt. % | 4 wt. % |
| --- | --- | --- | --- | --- |
| Pigment black FW 18 | 14.3 | — | 14.3 | — |
| PRINTEX 90 | — | 14.3 | — | 14.3 |
| LUTENSIT A-LBS | 3 | 3 | — | — |
| LUTENSIT A-BO | — | — | 5 | 5 |
| Water | 82.7 | 82.7 | 80.7 | 80.7 |
| Total | 100 | 100 | 100 | 100 |

LUTENSIT A-LBS is an Anionic Wetting Agent
   Manufacturer: BASF
   Substance group: Dodecylbenzene sulfonic acid, 58%
LUTENSIT A-BO is an Anionic Wetting Agent
   Manufacturer: BASF
   Substance group: dioctyl sulfosuccinate, Na salt, 60%
Freeze-drying
   Flocculation occurs when the dispersion is freeze-dried. Dodecylbenzene sulfonic acid and dioctyl sulfosuccinate, from the group of alkylbenzene sulfonates and sulfosuccinates, respectively, are not suitable for freeze-drying.

Example 1
1. Preliminary Preparation of the Wetting Agent Solution
   Water is initially introduced and LUTENSOL AO 30 is dissolved therein while warming to at most 60° C. After cooling, with stirring, the corresponding amounts of HYPERMER CG 6 and AMP 90 are added.
2. Incorporating the Carbon Black
   Pigment black FW 18 is gradually incorporated into the prepared wetting agent solution, with slow stirring (either manual or with a slow stirrer).
3. Dispersing
Ultrasound
   The dispersion prepared in paragraph 2, above, is dispersed using ultrasound. Very coarse particles can be separated from the dispersion prepared in this way in a centrifuge.

The composition of the aqueous carbon black dispersion is given in Table 2.

TABLE 2

| Example no. Dispersion: by ultrasound Components | 1 wt. % |
| --- | --- |
| Pigment black FW 18 | 15 |
| LUTENSOL AO 30 | 6 |
| HYPERMER CG 6 | 2 |
| AMP 90 | 0.2 |
| Water | 76.8 |
| Total | 100 |

4. Freeze-drying
   The pigment dispersion is then freeze-dried (type of equipment: Alpha 2–4 from the Christ Co.).
   Freeze-drying and drying are performed in an ice condenser chamber. The carbon black dispersion is placed in a dish, wherein the thickness of the layer is a maximum of 10 mm. The carbon black dispersion is cooled and frozen via a cooled control surface. The rate of freezing is between 0.1 and 3.0° C./min. After the product has reached a temperature of −40° C., the actual drying process starts.
   A reduced pressure of 2.0 to 2.5 mbar is applied to the ice condenser chamber and the control surface temperature is raised to 6° C. The product temperature settles down to a value of −15° C., due to the applied reduced pressure of about 2 mbar. The water vapor subliming out of the mixture is deposited on the ice condenser, the temperature of which is held at −80° C.
   To test the properties of the freeze-dried product, the product is placed in water and stirred with a spatula (23 g of freeze-dried product in 77 g of water). The ratios by weight are chosen so that in principle the initially prepared dispersion is re-formed.

The properties examined are given in Table 3.

TABLE 3

|  | Comparative Example (initial dispersion without freeze-drying) | Example 1 (freeze-drying) |
| --- | --- | --- |
| Average particle size | 116 nm | 174 nm |
| Intensity of color (Derussol P130 = 100% reference value) | 82.4 % | 96.8% |
| Black index My | 241.2 | 240.7 |

The average particle size is determined in nm using photon correlation spectroscopy.

The intensity of color is determined using a suitable spectral photometer or three-range color measuring instrument.

The redispersed, freeze-dried produce exhibits a much higher average particle size and intensity of color as compared with the initial dispersion. The stability of this dispersion is very high.

Pigment black FW 18 is a gas black with an average primary particle size of 15 nm.
LUTENSOL AO 30 is a Non-ionic Wetting Agent
  Manufacturer: BASF
  Substance group:
    non-ionic
    Alkyl ethoxylate
    Fatty alcohol ethoxylate
    Fatty alcohol ethoxylate with 30 ethylene glycol units.
HYPERMER CG 6 is a non-ionic wetting agent consisting of cross-linked polyoxyethylenacrylic acid (Manufacturer: ICI)
AMP 90 is an amine (Manufacturer: Angus Chemie).

The pigments according to the invention are used for coloring purposes to provide antistatic characteristics in water-based coloring and lacquer systems, disperse dyes, printing inks, inking systems or coating systems.

What is claimed is:

1. A pigment preparation, comprising at least one member selected from the group consisting of pigments and carbon blacks and at least one member selected from the group consisting of polymers and surfactants, wherein said surfactants are selected from the group consisting of cross-linked polyoxyethylene acrylic acids, fatty alcohol polyglycol ethers, polyvinylpyrrolidone, alkyl ethoxylates, alcohol alkoxylates, alkylpheno polyglycol ethers, lignin sulfonates, naphthalene sulfonic acid derivatives and mixtures thereof, wherein the pigment preparation is prepared from an aqueous dispersion by freeze-drying.

2. A pigment preparation according to claim 1, wherein the dispersion contains a pigment carbon black with an average primary particle size of 8 to 80 nm and a DBP-number of 40 to 200 ml/100 g.

3. A pigment preparation according to claim 1, wherein the dispersion contains a gas black with an average primary particle size of 8 to 30 nm.

4. A pigment preparation according to claim 1, wherein the surfactant comprises a wetting agent combination of two wetting agents.

5. A pigment preparation according to claim 4, wherein the wetting agents comprise a combination of:
  a) a cross-linked polyoxyethylene acrylic acid, and
  b) an alkyl ethoxylate.

6. A pigment preparation according to claim 4, wherein the wetting agents comprise a combination of:
  a) a cross-linked polyoxyethylene acrylic acid, and
  b) a fatty alcohol ethoxylate.

7. A pigment preparation according to claim 4, wherein the wetting agents comprise a combination of:
  a) a cross-linked polyoxyethylene acrylic acid, and
  b) a fatty alcohol ethoxylate with 30 ethylene glycol units.

8. A pigment preparation according to claim 7, wherein the wetting agents used in a ratio of a:b=1:1 to 1:10.

9. A method of using the pigment preparation in accordance with claim 1, comprising adding the pigment preparation to thermoplastic material for coloring and to provide antistatic characteristics in water-based coloring and lacquer systems, disperse dyes, printing inks, inking systems or coating systems.

10. The pigment preparation of claim 1, wherein the freeze-dried aqueous preparation is crushed.

* * * * *